United States Patent
Pytlik et al.

(10) Patent No.: US 8,357,465 B2
(45) Date of Patent: Jan. 22, 2013

(54) GALVANIC ELEMENT WITH A HIGH CAPACITY

(75) Inventors: Eduard Pytlik, Ellwangen (DE); Arno Perner, Ellwangen (DE); Martin Krebs, Rosenberg (DE); Dejan Ilic, Ellwangen (DE)

(73) Assignee: Varta Microbattery GmbH (DE)

( * ) Notice: Subject to any disclaimer, the term of this patent is extended or adjusted under 35 U.S.C. 154(b) by 372 days.

(21) Appl. No.: 12/526,808

(22) PCT Filed: Feb. 16, 2008

(86) PCT No.: PCT/EP2008/001218
§ 371 (c)(1),
(2), (4) Date: Apr. 12, 2010

(87) PCT Pub. No.: WO2008/098793
PCT Pub. Date: Aug. 21, 2008

(65) Prior Publication Data
US 2011/0159354 A1    Jun. 30, 2011

(30) Foreign Application Priority Data
Feb. 16, 2007 (DE) .................. 10 2007 009 295

(51) Int. Cl.
*H01M 4/58* (2010.01)
*H01M 4/80* (2006.01)
*H01M 10/34* (2006.01)

(52) U.S. Cl. ..... 429/162; 429/174; 429/215; 429/218.2; 429/223; 429/229; 429/232

(58) Field of Classification Search .......... 429/162, 429/174, 185, 206, 212, 215, 218.2, 223, 429/229, 232
See application file for complete search history.

(56) References Cited

U.S. PATENT DOCUMENTS

| | | | |
|---|---|---|---|
| 2,988,585 A | 6/1961 | Peters | |
| 4,637,967 A | 1/1987 | Keem et al. | |
| 5,034,289 A | 7/1991 | Yuasa et al. | |
| 5,219,678 A | 6/1993 | Hasebe et al. | |
| 5,725,967 A * | 3/1998 | Tuttle | 429/185 |
| 5,800,947 A | 9/1998 | Köhler et al. | |
| 6,066,184 A * | 5/2000 | Brenner | 429/185 |
| 6,309,779 B1 | 10/2001 | Tsuji et al. | |
| 6,387,148 B1 | 5/2002 | Nakano et al. | |
| 6,602,639 B1 | 8/2003 | Nakamura | |
| 2001/0016282 A1 | 8/2001 | Kilb et al. | |
| 2004/0185338 A1* | 9/2004 | Holl et al. | 429/174 |
| 2006/0237688 A1* | 10/2006 | Zimmermann | 429/218.2 |

FOREIGN PATENT DOCUMENTS

| | | |
|---|---|---|
| DE | 43 43 435 A1 | 6/1995 |
| DE | 44 17 732 A1 | 11/1995 |
| DE | 44 26 970 A1 | 2/1996 |
| DE | 600 00 157 E | 6/2002 |
| DE | 698 11 638 | 4/2003 |
| DE | 600 21 931 T2 | 2/2006 |
| EP | 0 460 424 A2 | 12/1991 |
| EP | 0 689 259 A1 | 12/1995 |

(Continued)

*Primary Examiner* — Robert B Davis
(74) *Attorney, Agent, or Firm* — DLA Piper LLP (US)

(57) ABSTRACT

A button cell includes a positive electrode, a negative electrode and a separator arranged in a housing comprising a cell cup and a cell lid insulated from one another by a seal, wherein the negative electrode is tablet-shaped pressed body having a self-supporting structure.

17 Claims, 1 Drawing Sheet

FOREIGN PATENT DOCUMENTS

| | | |
|---|---|---|
| EP | 0 965 652 A1 | 12/1999 |
| EP | 1 030 392 A2 | 8/2000 |
| EP | 1 073 134 A1 | 1/2001 |
| JP | 2000-113880 | 4/2000 |

* cited by examiner

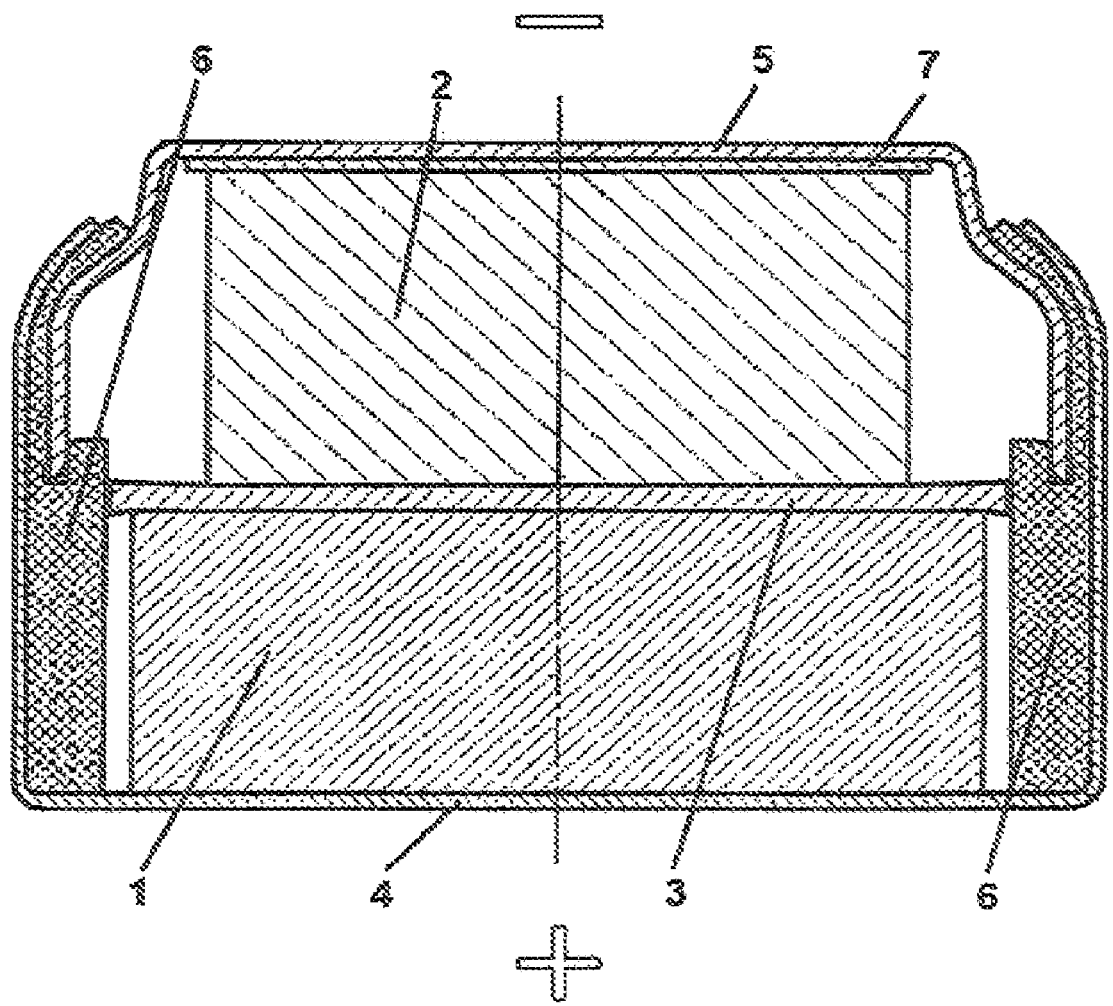

GALVANIC ELEMENT WITH A HIGH CAPACITY

RELATED APPLICATIONS

This is a §371 of International Application No. PCT/EP2008/001218, with an international filing date of Feb. 16, 2008 (WO 2008/098793 A1, published Aug. 21, 2008), which is based on German Patent Application No. 10 2007 009 295.6, filed Feb. 16, 2007.

TECHNICAL FIELD

This disclosure relates to an electrochemical element having a positive electrode, a negative electrode and a separator arranged in a housing comprising a cell cup and a cell lid which are insulated from one another by a seal, and also a pressed body which is suitable for use as negative electrode in such an electrochemical element.

BACKGROUND

Electrochemical elements such as batteries and accumulators are nowadays used in many fields. They are employed, in particular, for supplying portable appliances with electric energy. In very small appliances such as watches and hearing aids, the electrochemical elements are preferably used in the form of button cells. Hearing aids, in particular, have very high power consumption. Among modern hearing aids, a distinction is made between "behind the ear" devices (bte) and "in the ear" devices (ite) and canal devices which are used directly in the hearing canal. The power consumption of these devices depends, in particular, on the amplifier power. Higher-value devices additionally have microcomputers and transmission devices integrated into them, and these likewise have to be supplied with electric power.

Owing to the high power consumption, hearing aids are generally supplied by batteries of the electrochemical system zinc-air which have a particularly high capacity. Zinc-air button cells are essentially available commercially in four different sizes (in accordance with the standard IEC 60086-2). Hearing aids can generally be supplied with energy for from 3 days to 3 weeks when using zinc-air batteries in standard sizes.

Zinc-air batteries are not rechargeable and have to be disposed of appropriately after use. However, this is problematic since they contain about 1% by weight of mercury which should not get into the environment. In addition, the long-term use of a hearing aid is accordingly associated with high costs. For this reason, rechargeable batteries are increasingly being demanded. Among these, nickel-metal hydride batteries are particularly suitable since these have the same voltage as zinc-air batteries and a high current can be drawn from them. However, they have a very low capacity compared to zinc-air batteries. The maximum operating time of nickel-metal hydride batteries in the four sizes mentioned above is generally less than 1 day, so that they have to be recharged or replaced very frequently.

It could therefore be helpful to provide rechargeable batteries, in particular for hearing aids, which have a higher capacity than comparable known batteries. In addition, the batteries should also have an excellent cycling stability.

SUMMARY

We provide a button cell including a positive electrode, a negative electrode, and a separator arranged in a housing including a cell cup and a cell lid insulated from one another by a seal, wherein the negative electrode is a tablet-shaped pressed body having a self-supporting structure.

We also provide a pressed body for use as negative electrode, in the button cell, including a hydrogen storage alloy, and having a density in the range from about 5.0 g/cm$^3$ to about 7.5 g/cm$^3$.

BRIEF DESCRIPTION OF THE DRAWING

FIG. 1 is a schematic cross-section of an electrochemical element.

DETAILED DESCRIPTION

Our electrochemical elements have a positive electrode, a negative electrode and a separator. These are arranged in a housing comprising a cell cup and a cell lid which are insulated from one another by a seal. An electrochemical element is distinguished, in particular, by the negative electrode being present as a pressed body having a self-supporting structure. The pressed body preferably has the shape of a tablet.

Solid pressed electrodes in the form of tablets are already known, e.g., from DE 43 43 435 A1 in which an alkaline accumulator in the form of a button cell which is closed in a gastight manner is described. However, it has hitherto always been necessary to install the tablets in a basket of nickel wire before insertion into a housing. The nickel basket has both the function of an power outlet lead and also, in particular, a supporting function since solid pressed electrodes in the form of tablets which are known from the prior art have unsatisfactory structural integrity and can accordingly disintegrate during operation.

In contrast thereto, our electrochemical elements have, in particular, a negative electrode having a self-supporting structure, i.e., an electrode which can be installed without the otherwise customary basket. Such a separate, supporting component is not necessary and is also not provided.

The production of an electrode having a self-supporting structure and is in the form of a pressed body is associated with difficulties due, in particular, to the fact that the pressed body must not be compacted too much during production since it would otherwise have a porosity which is too low to enable it to take up sufficient electrolyte. On the other hand, if the pressure is too low, the resulting structure is unstable.

The negative electrode of an electrochemical element preferably comprises a powder which has been compacted at a pressure range from about 40 kN/cm$^2$ to about 120 kN/cm$^2$.

Particular preference is given to the negative electrode having a density in the range from about 5.0 g/cm$^3$ to about 7.5 g/cm$^3$, in particular, from about 5.0 g/cm$^3$ to about 6.5 g/cm$^3$.

The negative electrode preferably comprises a hydrogen storage alloy as active material. This is, in particular, an AB$_5$ alloy, i.e., for example, an alloy of one or more rare earth metals such as lanthanum and nickel in a ratio of about 1:5. If appropriate, the hydrogen storage alloy can additionally contain one or more further metals as additives.

The omission of the basket, which is superfluous because of the self-supporting structure of the negative electrode of our electrochemical element, results in more active material being able to be introduced into a battery housing having defined dimensions. Accordingly, the electrochemical element has a comparatively high capacity.

The hydrogen storage alloy may be present in particulate form having an average particle size in the range from about 0.1 μm to about 100 μm, preferably from about 10 μm to about 50 μm.

Particular preference is given to the negative electrode of an electrochemical element comprising at least one hydrophobic, water-insoluble polymer. The at least one polymer can, in particular, be present in the interstices formed by mutual contact of particles of the hydrogen storage alloy and can be distributed on the surfaces of the alloy. The at least one polymer can form regions in the electrode which can be wetted to only a small extent, if at all, by the electrolyte.

The at least one polymer is preferably a polyolefin, in particular, a halogenated polyolefin, particularly preferably a polyhaloolefin.

Preference is also given to the at least one polymer being a fluorinated or perfluorinated polymer, in particular, PTFE (polytetrafluoroethylene) and/or PCTFE (polychlorotrifluoroethylene).

The at least one polymer is preferably present in the negative electrode of an electrochemical element in a proportion of from about 0.1% by weight to about 5% by weight, in particular from about 0.5% by weight to about 3% by weight, particularly preferably from about 0.5% by weight to about 2% by weight.

The at least one polymer is preferably present in particulate form having an average particle size in the range from about 0.1 µm to about 100 µm, preferably from about 10 µm to about 50 µm, in the negative electrode.

The negative electrode can, in some cases, comprise at least one conductive auxiliary, in particular, a conductive auxiliary from the group consisting of carbon-based, preferably amorphous conductive auxiliaries and metallic conductive auxiliaries.

The negative electrode preferably comprises at least one metal powder, in particular, nickel powder, as conductive auxiliary.

Furthermore, the negative electrode can comprise carbon black and/or graphite as conductive auxiliary.

The at least one conductive auxiliary is preferably present in the at least one negative electrode in a proportion of from about 0.1 to about 10% by weight, in particular from about 0.5% by weight to about 5% by weight, particularly preferably from about 0.5% by weight to about 3% by weight.

Particular preference is given to an electrochemical element in which the negative electrode has a pore content in the range from about 0.5% by volume to about 40% by volume, preferably from about 0.5% by volume to about 15% by volume, in particular from about 5% by volume to about 10% by volume (a corresponding volume of electrolyte can be taken up by such a negative electrode).

When the negative electrode has been made essentially exclusively by pressing a hydrogen storage alloy, i.e., is essentially free of the at least one polymer and/or the at least one conductive auxiliary, it preferably has a pore content in the range from about 25% by volume to about 40% by volume.

In a particularly preferred aspect of the electrochemical element, this has a positive electrode in which the active material is embedded in a conductive support.

Electrodes in which the active material is embedded in a conductive support are described comprehensively in the above-mentioned DE 43 43 435 A1, the subject matter of which is incorporated herein by reference.

The conductive support can be, in particular, a metal sponge (also known as "metal foam") or a metal felt. As regards the properties of particularly suitable conductive supports, reference is made to DE 43 43 435 A1 in which these are described comprehensively. Thus, metal sponges having a pore content in the range from about 85% by volume to about 97% by volume, in particular about 95% by volume, are particularly preferred. The pore size of suitable metal sponges is, in particular, in the range from about 50 µm to about 500 µm.

The conductive support particularly preferably comprises at least one metal, in particular nickel.

It is mentioned in DE 43 43 435 A1 that the use of such a conductive support makes it possible to dispense with a metal basket which envelopes the positive electrode. Accordingly, the electrochemical element is also preferably free of the above-described metal basket having a supporting function and a power outlet lead function on the side of the positive electrode. The conductive support has, like the above-described negative electrode which is present as a pressed body, a self-supporting structure and also performs the function of a power outlet lead.

The positive electrode preferably comprises, as active material, nickel hydroxide and/or nickel oxide hydroxide which can be introduced, for example, as a homogeneous aqueous paste into the conductive support. In addition, the positive electrode can contain additives such as binders and, in particular, conductive auxiliaries.

An electrochemical element preferably has a metallic housing. Cell cups and/or cell lids made of stainless steel/nickel-plated steel are particularly useful. Housings made of a trimetal (a laminar arrangement of three metals), in particular, steel sheet having an interior coating of copper and an exterior coating of nickel, can also be used with preference.

An electrochemical element preferably comprises an alkaline electrolyte. This is introduced before the housing is closed and at least partly fills the pores of the electrodes.

Furthermore, preference is given to an electrochemical element having a cell cup and/or a cell lid having a thickness of less than about 0.15 mm.

Electrochemical elements having such thin housing components make available a correspondingly large internal volume and thus a great deal of space for active material. However, such housings also have to be able to withstand pressures which can, for example, arise as a result of gas evolution on overcharging or during assembly so as to prevent leakage of electrolyte.

A particularly high freedom from leaks and a particularly high mechanical stability are obtained in the case of an electrochemical element having a housing which comprises a cell cup and a cell lid and has a seal which extends along the interior wall of the cell cup to the bottom of the cell cup. An electrochemical element can have a seal configured in this way, but such a seal can in principle be used in all electrochemical elements of the type in question, not only in electrochemical elements having a negative electrode in the form of a pressed body having a self-supporting structure as described above.

We therefore also provide an electrochemical element having a positive electrode, a negative electrode and a separator which are arranged in a housing comprising a cell cup and a cell lid which are insulated from one another by a seal, with the seal extending along the interior wall of the cell cup to the bottom of the cell cup.

In an electrochemical element having such a specifically configured seal, it is essentially possible for all features of the electrochemical element having a negative electrode in the form of a pressed body having a self-supporting structure, in particular, in respect of the properties of the cell cup and the cell lid, to be realized. The corresponding descriptions are hereby expressly incorporated by reference at this point.

Electrochemical elements in button cell form known from the prior art generally have seals arranged between the cell lid and the cell cup, frequently also around the edge of the cell lid, so that they project into the interior of the cell. The cell lid and the seal are in these cases always arranged above the separator which divides the interior margin of known button cells into an upper compartment and a lower compartment.

Our electrochemical element having the seal described is significantly different therefrom. The separator arranged between positive and negative electrodes has no direct contact with the cell cup or the cell lid. It adjoins the seal at the side.

The seal of an electrochemical element is preferably in physical contact with the interior wall of the cell cup and is very thin.

Preferably, the seal encloses the edge of the cell lid and thus ensures high mechanical stability. In particular, it can have a recess into which the edge of the cell lid can be pushed. In this case, the cell lid rests on the seal and cannot be pressed, especially as a result of external pressures as occur, for example, when crimping the edge of the cell cup, into the cells and damage the separator.

The electrochemical elements which have been described can have either a film seal or an injection-molded seal. However, particularly in the above-described electrochemical element having a seal which extends along the interior wall of the cell cup to the bottom of the cell cup and encloses the edge of the cell lid, the seal is particularly preferably an injection-molded shaped seal.

As has been stated at the outset, it could be helpful to provide capacity-optimized electrochemical elements for hearing aids. Accordingly, our electrochemical element may have the external dimensions of a standardized button cell (in accordance with the standard IEC 60086-2).

As has been mentioned above, a pressed body which is suitable for use as negative electrode, in particular, in an electrochemical element, is also provided. It comprises a hydrogen storage alloy and, if appropriate, at least one hydrophobic, water-insoluble polymer and/or at least one conductive auxiliary and is characterized in that it has a density in the range from about 5.0 g/cm$^3$ to about 7.5 g/cm$^3$, in particular from about 5.0 g/cm$^3$ to about 6.5 g/cm$^3$.

Preferably, the pressed body consists of the hydrogen storage alloy, i.e., contains neither a conductive auxiliary nor a hydrophobic polymer.

However, preference is generally given to the pressed body comprising a mixture of the three above-mentioned solid components hydrogen storage alloy, hydrophobic, water-insoluble polymer and conductive auxiliary.

Hydrogen storage alloys, water-insoluble polymers and conductive auxiliaries which are suitable for our purposes have already been described comprehensively. The corresponding statements are hereby incorporated by reference at this point.

This also applies with regard to the other properties of the pressed body, e.g., porosity and pressing pressure during production, which have likewise been described above.

The above-mentioned and further advantages of our electrochemical elements can be derived from the following description and the drawing. Individual features can be realized either alone or in combination with one another. The examples described serve merely for the purposes of illustration and to give a better understanding and do not constitute a restriction.

Turning now to the drawing, FIG. 1 schematically shows the cross section of an electro-chemical element and a pressed body (negative electrode). The positive electrode (cathode) 1 comprises a nickel foam in which nickel hydroxide/nickel oxide hydroxide (Ni(OH)$_2$/NiOOH) is embedded as active material. Above the positive electrode 1, there is the pressed body as negative electrode (anode) 2 which is separated from the positive electrode 1 by the separator 3. Neither the negative electrode 2 nor the positive electrode 1 have a metallic basket as support framework. Both electrodes have a self-supporting structure. The negative electrode 2 consists essentially of an AB$_5$ hydrogen storage alloy. The housing of the electrochemical element depicted consists essentially of the housing cup 4 and the housing lid 5. It comprises stainless steel/nickel-plated steel (obtainable, for example, under the trade name Hilumin®) and has a thickness of less than 0.15 mm. The seal 6 completely covers the interior wall of the housing cup. It firstly insulates the housing cup from the housing lid and, secondly, has a support function. It has a recess in which the edge of the housing lid is embedded and ensures appropriate stability against pressure, as can occur, for example, during crimping of the housing cup. The spring element 7 composed of nickel is arranged between the negative electrode 2 and the housing lid 5. This spring element 7 accommodates volume changes to which the negative electrode is subject during charging and discharge of the electrochemical element.

EXAMPLES

Negative electrodes which were not inserted into baskets made of nickel wire, but had instead been produced as pressed bodies having a self-supporting structure were installed in various types of button cells (types PR44, PR48, PR41 and PR70 in accordance with IEC 60086-2). The pressed bodies had different properties (area, height, volume, weight) depending on the type of button cell and had been compacted at various pressures. In all cases, the same hydrogen storage alloy having a bulk density of 7.95 g/cm$^3$ was used. This resulted in a pressed body having a particular density and a particular porosity (see Table 1).

TABLE 1

| IEC type | Pressing force kN | Area cm$^2$ | Pressing pressure kN/cm$^2$ | Height mm | Volume cm$^3$ | Weight mg | Density g/cm$^3$ | Pores vol % |
|---|---|---|---|---|---|---|---|---|
| PR44 | 45 | 0.52 | 87.3 | 2.35 | 0.121 | 700 | 5.78 | 27% |
| PR48 | 10 | 0.21 | 47.1 | 2.3 | 0.049 | 265 | 5.43 | 32% |
| PR41 | 13 | 0.21 | 61.2 | 1.45 | 0.031 | 170 | 5.52 | 31% |
| PR70 | 9 | 0.10 | 88.4 | 1.45 | 0.015 | 80 | 5.42 | 32% |

In the case of all button cells, a capacity higher than that of comparable cells having a conventional negative electrode was measured. Some measured data are shown in Table 2. Furthermore, all button cells had an excellent cycling stability (several hundred cycles).

TABLE 2

| Type | IEC type | Capacity mAh | Internal resistance mΩ (AC, 1 kHz) | Energy density Wh/l | Power density W/l |
|---|---|---|---|---|---|
| 10 | PR70 | 12 | 2000-2500 | 158 | 1004 |
| 312 | PR41 | 23 | 800-1000 | 163 | 1322 |
| 13 | PR48 | 30 | 800-1000 | 142 | 882 |

The invention claimed is:

1. A button cell comprising: a positive electrode, a negative electrode, and a separator arranged in a housing comprising a cell cup and a cell lid insulated from one another by a seal, wherein the negative electrode is a tablet-shaped pressed body having a self-supporting structure and a density of about 5.0 g/cm³ to about 7.5 g/cm³ and consists of a hydrogen storage alloy, a hydrophobic, water-insoluble PCTFE polymer and a conductive auxiliary.

2. The button cell as claimed in claim 1, wherein the negative electrode comprises a powder which has been compacted at a pressure in the range from about 40 kN/cm² to about 120 kN/cm².

3. The button cell as claimed in claim 1, wherein the hydrogen storage alloy is in particulate form having an average particle size in the range from about 0.1 μm to about 100 μm.

4. The button cell as claimed in claim 1, wherein the at least one polymer is present in the negative electrode in a proportion of from about 0.1% by weight to about 5% by weight.

5. The button cell as claimed in claim 1, wherein the at least one polymer is in particulate form having an average particle size in the range from about 0.1 μm to about 100 μm.

6. The button cell as claimed in claim 1, wherein the conductive auxiliary is at least one selected from the group consisting of carbon-based conductive auxiliaries and metallic conductive auxiliaries.

7. The button cell as claimed in claim 6, wherein the at least one conductive auxiliary is in the negative electrode in a proportion of from about 0.1 to about 10% by weight.

8. The button cell as claimed in claim 1, wherein the negative electrode has a pore content in the range from about 0.5% by volume to about 40% by volume.

9. The button cell as claimed in claim 1, wherein the negative electrode has a pore content in the range from about 0.5% by volume to about 15% by volume.

10. The button cell as claimed in claim 1, wherein the active material of the positive electrode is embedded in a conductive support.

11. The button cell as claimed in claim 10, wherein the conductive support is a metal sponge or a metal felt.

12. The button cell as claimed in claim 10, wherein the conductive support comprises at least one metal.

13. The button cell as claimed in claim 1, wherein the positive electrode comprises nickel hydroxide and/or nickel oxide hydroxide as active material.

14. The button cell as claimed in claim 1, wherein the seal extends along an interior wall of the cell cup to a bottom portion of the cell cup.

15. The button cell as claimed in claim 14, wherein the seal encloses an edge portion of the cell lid.

16. The button cell as claimed in claim 14, wherein the seal is a film seal.

17. The button cell as claimed in claim 14, wherein the seal is an injection-molded shaped seal.

* * * * *